(12) United States Patent
Kurosawa (10) Patent No.: US 8,595,611 B2
(45) Date of Patent: Nov. 26, 2013

(54) ADDED INFORMATION DISTRIBUTION APPARATUS AND ADDED INFORMATION DISTRIBUTION SYSTEM

(75) Inventor: Akira Kurosawa, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1283 days.

(21) Appl. No.: 11/609,475

(22) Filed: Dec. 12, 2006

(65) Prior Publication Data

US 2007/0288839 A1  Dec. 13, 2007

(30) Foreign Application Priority Data

Jun. 13, 2006  (JP) ................................ 2006-163635

(51) Int. Cl.
*G06F 17/00*  (2006.01)
(52) U.S. Cl.
USPC .......................................... 715/230; 715/200
(58) Field of Classification Search
USPC .................. 715/255, 200, 230–233
See application file for complete search history.

(56) References Cited

U.S. PATENT DOCUMENTS

| | | | | |
|---|---|---|---|---|
| 5,781,732 | A * | 7/1998 | Adams ........................... | 709/205 |
| 6,859,909 | B1 * | 2/2005 | Lerner et al. ................... | 715/203 |
| 6,917,965 | B2 * | 7/2005 | Gupta et al. .................. | 709/206 |
| 7,502,822 | B2 * | 3/2009 | Bou-Ghannam et al. ..... | 709/203 |
| 2004/0194021 | A1 * | 9/2004 | Marshall et al. .............. | 715/512 |
| 2004/0250201 | A1 * | 12/2004 | Caspi ............................. | 715/512 |
| 2005/0188016 | A1 * | 8/2005 | Vdaygiri et al. .............. | 709/205 |
| 2005/0223315 | A1 | 10/2005 | Shimizu et al. | |
| 2006/0224950 | A1 * | 10/2006 | Takaai et al. ................... | 715/512 |
| 2009/0013043 | A1 * | 1/2009 | Tan ............................... | 709/205 |

FOREIGN PATENT DOCUMENTS

| | | |
|---|---|---|
| JP | 6006375 | 1/1994 |
| JP | 10187712 | 7/1998 |
| JP | 2002244976 | 8/2002 |
| JP | 2004-021631 | 1/2004 |
| JP | 2004342098 | 12/2004 |
| JP | 2005228262 | 8/2005 |
| JP | 2005293239 A | 10/2005 |
| JP | 2005339295 A | 12/2005 |

OTHER PUBLICATIONS

Office Action issued on Oct. 30, 2008 by the Korean Patent Office for corresponding Korean Patent Application U.S. Appl. No. 10-2007-0028641, with English translation.
Chinese Office Action issued in connection with corresponding Chinese Patent Application No. 2007100967151, issued on Aug. 7, 2009, with partial English translation.
Japanese Notice of Grounds for Rejection for Application No. 2006-163635 issued in Japanese with excerpt English translation thereof. Issued on Jun. 7, 2011.

* cited by examiner

*Primary Examiner* — Manglesh M Patel
(74) *Attorney, Agent, or Firm* — Gesmer Updegrove LLP (57) ABSTRACT

There is provided an added information distribution apparatus including a receiving section that receives added information which are added to a shared electronic document; added information memory that stores information on the added information; a message management section that, when the receiving section receives added information, identifies pieces of added information which should be transmitted as a message from among the received added information or the stored added information in accordance with preset conditions for transmission, and compiles one or more pieces of identified added information together to compose a message; and a message transmission processing section that transmits the composed messages to members who share the electronic document.

8 Claims, 8 Drawing Sheets

ANNOTATION INFORMATION

| ANNOTA-TION ID | DOCUME-NT ID | PERSON WHO ADDED | DATE AND TIME OF ADDITION | POSITION INFORMATION | ATTRIBUTE INFORMATION | CONTENTS |
|---|---|---|---|---|---|---|
| 0001 | 0001 | USER A | 2003/10/01 10:00 | P 1, (520,600)– (600,800) | TYPE=BALOON; PRIORITY=HIGH; .... | THIS COULD BE WRITTEN A LITTLE BETTER... |
| 0002 | 0001 | USER B | 2003/10/02 11:00 | P 2, (1030,250)– (1080,300) | TYPE=RECTANGLE; PRORITY=NORMAL; .... | PLEASE DESCRIBE THE SITUATION... |
| 0003 | 0002 | USER C | 2003/10/02 12:00 | P 3, (1700,250)– (1800,300) | TYPE=ARROW; PRIORITY=NORMAL; .... | WE'RE NOW GIVING A PROMOTIONAL CAMPAIGN... |
| . . . | . . . | | . . . | | | . . . |

| DOCUMENT ID | CONTENTS |
|---|---|
| 0001 | THIS NOTE IS · · · |
| 0002 | OVERVIEW OF OUR PROPOSAL · · · |
| 0003 | THIS YEAR'S BUDGET IS · · · |
| . . . | . . . |

Fig. 4

| DOCUMENT ID | DOCUMENT NAME | |
|---|---|---|
| 0001 | NOTE.txt | |
| 0002 | PROPOSAL.txt | |
| 0003 | PROPOSED_BUDGET.txt | |
| ... | ... | ... |

Fig. 5

| USER ID | NAME | MAIL ADDRESS |
|---|---|---|
| USER A | Mr. A | userA@sample.com |
| USER B | Mr. B | userB@sample.com |
| USER C | Mr. C | userC@sample.com |
| USER D | Mr. D | userD@sample.com |
| USER E | Mr. E | userE@sample.com |
| . . . | . . . | . . . |

ANNOTATION INFORMATION

| ANNOTA-TION ID | DOCUME-NT ID | PERSON WHO ADDED | DATE AND TIME OF ADDITION | POSITION INFORMATION | ATTRIBUTE INFORMATION | CONTENTS |
|---|---|---|---|---|---|---|
| 0001 | 0001 | USER A | 2003/10/01 10:00 | P1, (520,600)−(600,800) | TYPE=BALOON; PRIORITY=HIGH; .... | THIS COULD BE WRITTEN A LITTLE BETTER... |
| 0002 | 0001 | USER B | 2003/10/02 11:00 | P2, (1030,250)−(1080,300) | TYPE=RECTANGLE; PRORITY=NORMAL; .... | PLEASE DESCRIBE THE SITUATION... |
| 0003 | 0002 | USER C | 2003/10/02 12:00 | P3, (1700,250)−(1800,300) | TYPE=ARROW; PRORITY=NORMAL; .... | WE'RE NOW GIVING A PROMOTIONAL CAMPAIGN... |
| ... | | | | ... | | ... |

Fig. 10

MESSAGE INFORMATION

| NOTFITY ID | DOCUMENT ID | ANNOTA-TION ID | PERSON WHO ADDED | RECEIVING USER | CLASSIFICATION CATEGORY | DATE AND TIME OF SPOOLING |
|---|---|---|---|---|---|---|
| 1000 | 0001 | 0001 | USER A | USER A;USER B;USER D | 1 | 2003/10/01 10:00 |
| 1001 | 0001 | 0002 | USER B | USER A;USER B;USER D | 1 | 2003/10/02 11:00 |
| 1002 | 0002 | 0003 | USER C | USER C;USER D;USER E | 3 | 2003/10/02 12:00 |

Fig. 11

ADDED INFORMATION DISTRIBUTION APPARATUS AND ADDED INFORMATION DISTRIBUTION SYSTEM

PRIORITY INFORMATION

This application claims priority to Japanese Patent Application No. 2006-163635 filed on Jun. 13, 2006.

BACKGROUND

1. Technical Field

The present invention relates to a distribution process for annotations that are added to a shared electronic document to members who share the electronic document.

2. Related Art

Some conventional systems for maintaining electronic documents so that they can be shared allow users to add annotations to the electronic documents. By utilizing such an electronic document management system that allows addition of annotations, persons concerned can review a single shared document while individually attaching annotations to appropriate positions in the document, for example.

There has also been a known technique for notifying contents of annotations attached to a shared document to all persons involved such as by means of an electronic mail function. Thus, each individual person can learn that annotations have been added without performing an operation of opening the shared document and confirming the annotations.

SUMMARY

According to an aspect of the invention, an added information distribution system includes a receiving section that receives added information which are added to a shared electronic document; added information memory that stores information on the added information; a message management section that, when the receiving section receives added information, identifies pieces of added information which should be transmitted as a message from among the received added information or the stored added information in accordance with preset conditions for transmission, and compiles one or more pieces of identified added information together to compose a message; and a message transmission processing section that transmits the composed messages to members who share the electronic document.

BRIEF DESCRIPTION OF THE DRAWINGS

Exemplary embodiments of the present invention will be described in detail based on the following figures, wherein.

DETAILED DESCRIPTION

Exemplary embodiments of the present invention will be described below with respect to drawings.

Figure 1:
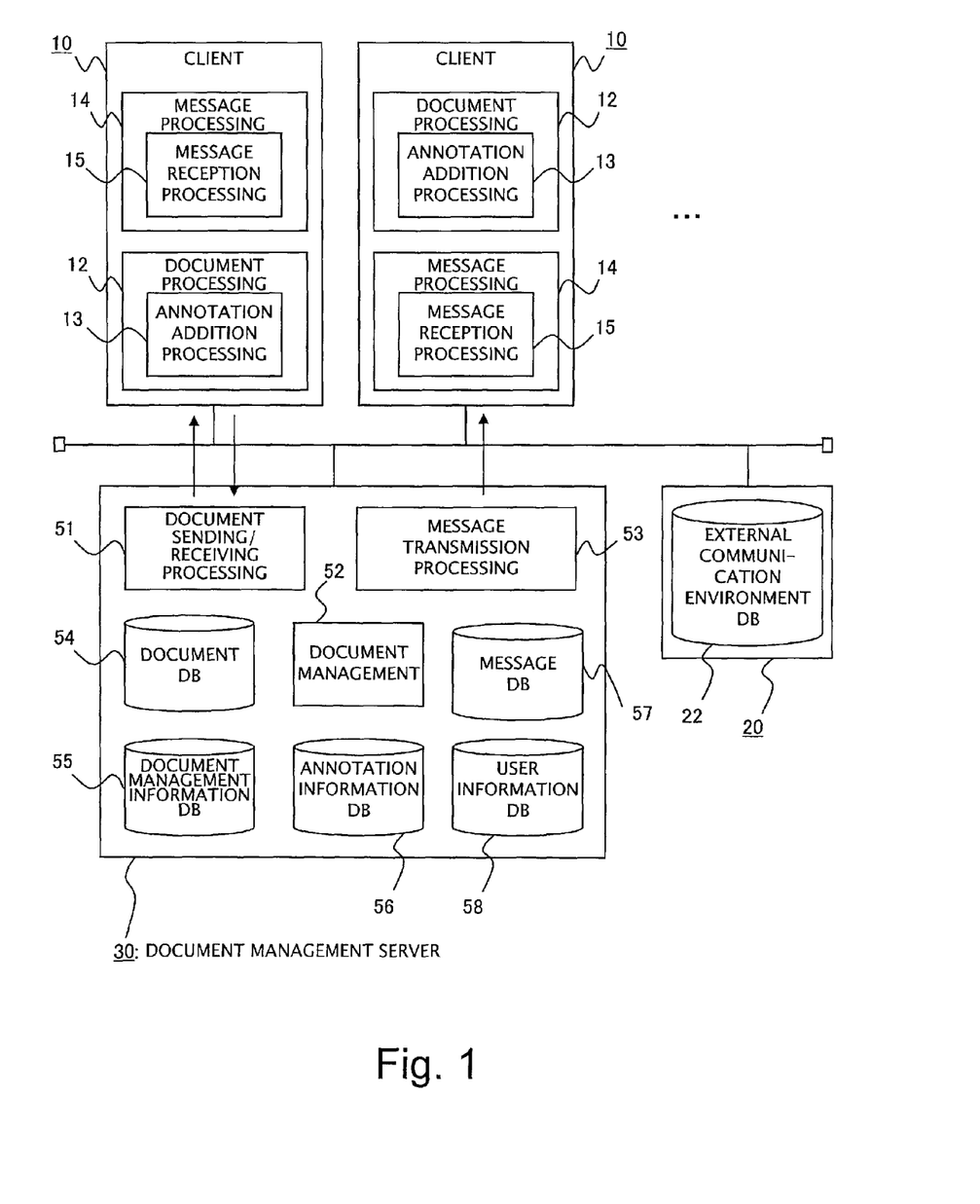
FIG. 1 is a block diagram showing the configuration of an exemplary embodiment of an annotation information distribution system of the present invention.

FIG. 1 is a block diagram showing the configuration of an exemplary embodiment of an annotation information distribution system according to the present invention. The annotation information distribution system of the exemplary embodiment is a system that is used, when an annotation is added to a shared electronic document by a user who is one of the members sharing the document, for distributing the contents of the annotation to all members as a message. FIG. 1 illustrates a configuration in which two clients 10, a server computer 20 for providing a place of communication within the system, and a document management server 30 for centrally managing shared documents and annotations added thereto in the system are interconnected by a network 2. An annotation is an electronic sticky that can be added to an electronic document for writing information on. Such a form is also possible where information is written on an annotation and the annotation is then added to an electronic document. Such documents may include contracts, specifications, drawings that contain text and/or figures, and images.

Figure 2:
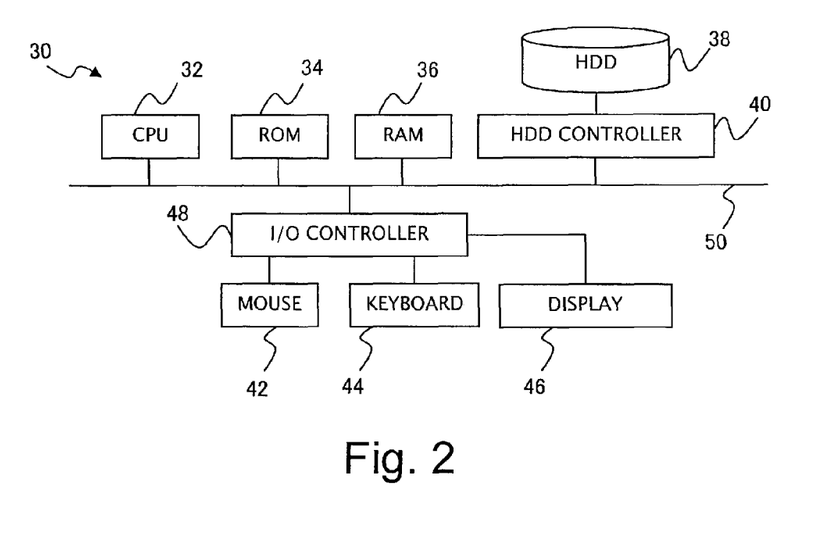
FIG. 2 illustrates the hardware configuration of a document management server of the exemplary embodiment.

FIG. 2 shows the hardware configuration of the document management server 30 of the exemplary embodiment. The document management server 30 used in this exemplary embodiment can be realized by a conventional generic hardware configuration for server computers. That is, as shown in FIG. 2, the server computer is configured with a CPU 32; ROM 34; RAM 36; a HDD controller 40 to which a hard disk drive (HDD) 38 is connected; an input/output controller 48 that is connected to a mouse 42 and a keyboard 44 provided as input devices and a display 46 provided as a display device, these components being connected to an internal bus 50. As the client 10 and server computer 20 can also be realized by generic computers, their hardware configurations may be the one illustrated in FIG. 2.

In FIG. 1, the client 10 is a computer for use by members who share documents and it can be realized by a generic personal computer (PC). Each member adds annotations to the shared documents using the client 10 and receives contents of annotations that have been added to the shared documents as a message. Each client 10 thus has a document processing unit 12 and a message processing unit 14. The document processing unit 12 is realized by a document processing application that has a function of adding annotations to electronic documents. An annotation addition processing unit 13 is realized by implementing the annotation function. The message processing unit 14 receives an annotation as a message. This exemplary embodiment assumes that messages are received by electronic mail, thus the message processing unit 14 is realized by implementing an electronic mail function. A message reception processing unit 15 is realized by implementing an electronic mail receiving function.

Although message exchange by electronic mail requires a mail server and the like, such components are omitted from the figures as they are not essential to the exemplary embodiment. In addition, although FIG. 1 illustrates only two clients for the sake of simplicity, this is not limiting. A single client may be shared by some users or there may be three or more clients. Components 12 and 14 of the client 10 are realized by cooperative operation of a computer that serves as the client 10 and programs that run on a CPU mounted in the computer. It is noted that the programs may be stored on a computer readable medium.

The server computer 20 is a computer that has a collaboration function for realizing a cooperative operation environment on a network and is utilized for providing a place of communication to users. In an external communication environment database (DB) 22, various information necessary for providing the collaboration function is accumulated. Various functions provided by the server computer 20 are realized through cooperative operation of a computer that serves as the server computer 20 and programs that run on a CPU mounted in the computer. It is noted that the programs may be stored on a computer readable medium. The external communication environment database 22 is realized by an external storage device mounted in the server computer 20.

The document management server 30 includes a document sending/receiving processing unit 51, a document management unit 52, a message transmission unit 53, a document database (DB) 54, a document management information database (DB) 55, an annotation information database (DB) 56, a message database (DB) 57, and a user information database (DB) 58. The document database 54 stores shared electronic documents and the document management information database 55 stores information for managing the electronic documents stored in the document database 54. The document sending/receiving processing unit 51 sends/receives electronic documents to/from the client 10. More specifically, the document sending/receiving processing unit 51 sends an electronic document to which annotations will be added to the client 10 in response to an instruction from the client 10 and also receives the electronic document with annotations added from the client 10. The document management unit 52 provides overall management of electronic documents handled on the document management server 30. More specifically, the document management unit 52 extracts annotations added at the client 10 from an electronic document received by the document sending/receiving processing unit 51, generates information on the annotations, registers the information in the annotation information database 56, and stores the electronic document without the annotations in the document database 54. The document management unit 52 also retrieves an electronic document to be sent to the client 10 from the document database 54 and merges corresponding annotations retrieved from the annotation information database 56 with the electronic document. The message transmission processing unit 53 compiles one or more annotations together where appropriate that have been added to an electronic document for each member who shares the electronic document in accordance with predefined conditions for transmission, thereby composing messages to be sent to individual members. It then sends the messages to the members at a predetermined timing specified by the members. The message database 57 is a storage for temporarily saving transmitted messages, and information on individual users as members who share electronic documents is set and registered in the user information database 58. While this exemplary embodiment provides the document database 54 and the user information database 58 on the document management server 30 so that the document management server 30 maintains and monitors such information, the document management server 30 may be configured to effectively utilize such information managed on the server computer 20 or other computers.

The components 51 to 53 of the document management server 30 are realized through cooperative operation of a computer that serves as the document management server 30 and programs that run on a CPU mounted in the computer. It is noted that the programs may be stored on a computer readable medium. The data bases 54 to 58 are realized by external storage devices mounted in the document management server 30.

Figure 3:
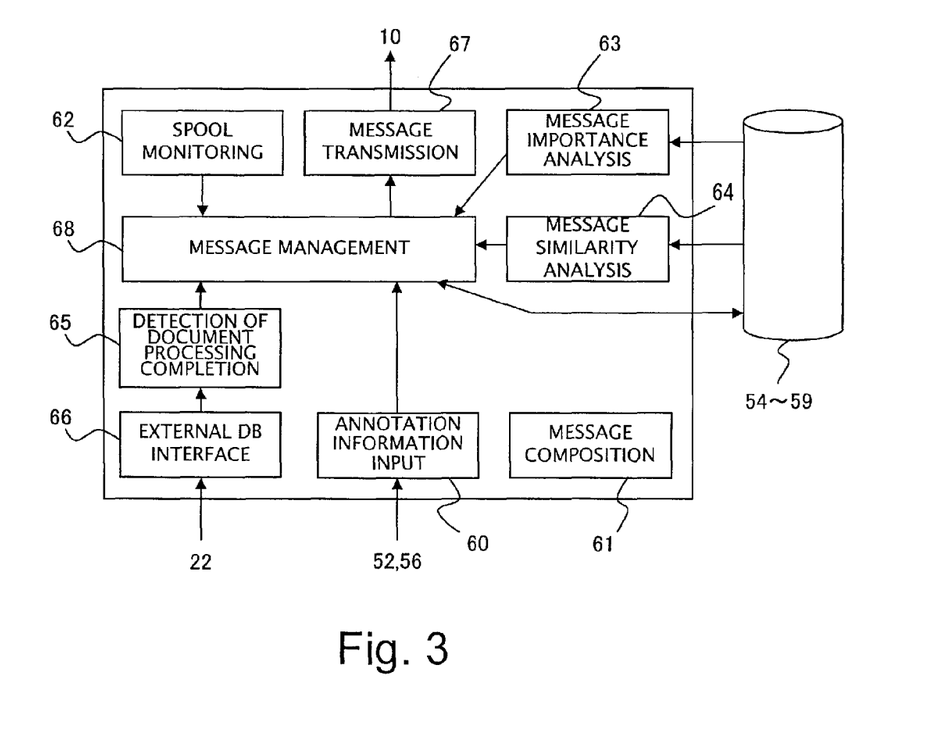
FIG. 3 is a block diagram showing the internal configuration of a message transmission processing unit of the exemplary embodiment.

FIG. 3 is a block diagram showing the internal configuration of the message transmission processing unit 53 of the exemplary embodiment. An annotation information input unit 60 receives annotations to be sent to members from the document management unit 52 or retrieves such annotations from the annotation information database 56. A message composition unit 61 compiles one or more annotations to be sent together on a per-member basis according to preset conditions for transmission to thereby create messages to be sent to individual members. A spool monitoring unit 62, a message importance analysis unit 63, a message similarity analysis unit 64, and a document processing completion detecting unit 65 are components for determining whether conditions for sending an annotation are met. The spool monitoring unit 62 periodically issues an instruction for checking spool to the message management unit 68. As will be described in more detail below, the message importance analysis unit 63 analyzes how important a message is. The message similarity analysis unit 64 analyzes how similar messages are, as will be described in detail below. The document processing completion detecting unit 65 accesses the server computer 20 by way of an external database interfacing unit 66 to detect that annotation addition by a member has finished. A message transmission unit 67 sends a composed message to the client 10 used by the member who should receive it. Since the exemplary embodiment utilizes the electronic mail function as a tool for sending messages as mentioned above, the message is sent by electronic mail. The message management unit 68 controls operations of all the components that constitute the message transmission processing unit 53 to provide overall management on message composition based on unsent annotations and/or transmission of messages. As will be described in more detail below, when the message management unit 68 detects satisfaction of transmission conditions at the spool monitoring unit 62, message importance analysis unit 63, message similarity analysis unit 64, and document processing completion detecting unit 65, the message management unit 68 specifies annotations that meet the conditions, has the message composition unit 61 compose messages based on the specified annotations, and has the message transmission unit 67 send the messages at a predetermined timing.

Figure 4:
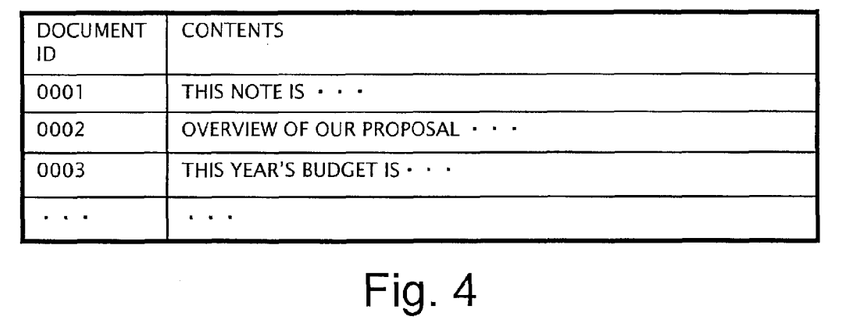
FIG. 4 illustrates an exemplary data structure in a document database of the exemplary embodiment.
Figure 5:
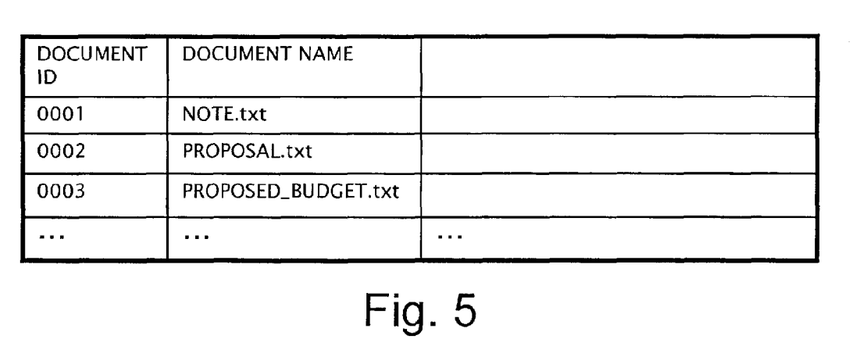
FIG. 5 illustrates an exemplary data structure in a document management information database of the exemplary embodiment.
Figure 6:
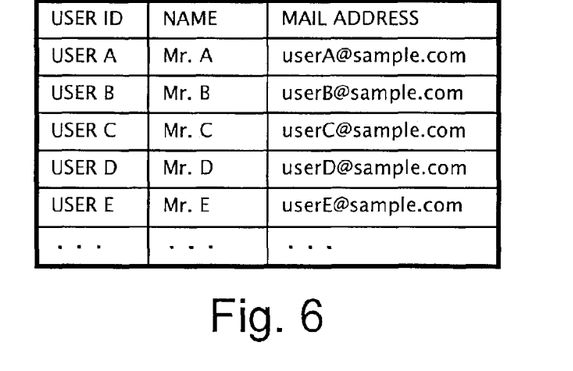
FIG. 6 illustrates an exemplary data structure in a user information database of the exemplary embodiment.

FIGS. 4, 5 and 6 show exemplary data structures in the document database 54, document management information database 55, and user information database 58, respectively. In the document database 54, a document ID as information that can identify an electronic document is registered, associated with the actual contents of the electronic document. In the document management information database 55, information on an electronic document, such as document name at least, is registered, associated with a document ID. A document name and an actual document are associated with each other by a document ID. In the user information database 58, information on each user as one of the members who share electronic documents maintained and managed on the document management server 30 is set and registered. As shown in FIG. 6, a user ID as information that can identify a user, a user name, and a mail address that indicate where a message to the user should be sent are registered in association with each other. When it is desirable to specify sharing users for each electronic document, each user ID can be set/registered in association with the document ID of an electronic document that can be shared among the users.

Operations in this exemplary embodiment will be described below. The exemplary embodiment is an assumption of a usage case where electronic documents such as feature specifications are created for a certain project and its development members review such documents. Specifically, each member who uses the client 10 retrieves an electronic document to be reviewed from the document management server 30 and adds an annotation at a position in the electronic document if he has some comment. The exemplary embodiment is particularly advantageous when notifying such added annotations to other members.

The exemplary embodiment in principle compiles a number of annotations into a single message if the annotations meet preset conditions for transmission and sends the message to appropriate users, thereby avoiding reduction of work efficiency and the like. Meanwhile, the exemplary embodiment enables an annotation that is important or urgent to be notified to users even by itself. Thus, the exemplary embodiment is characterized in that it can handle annotation notification to users flexibly based on the number or type of annotations.

Figure 7:
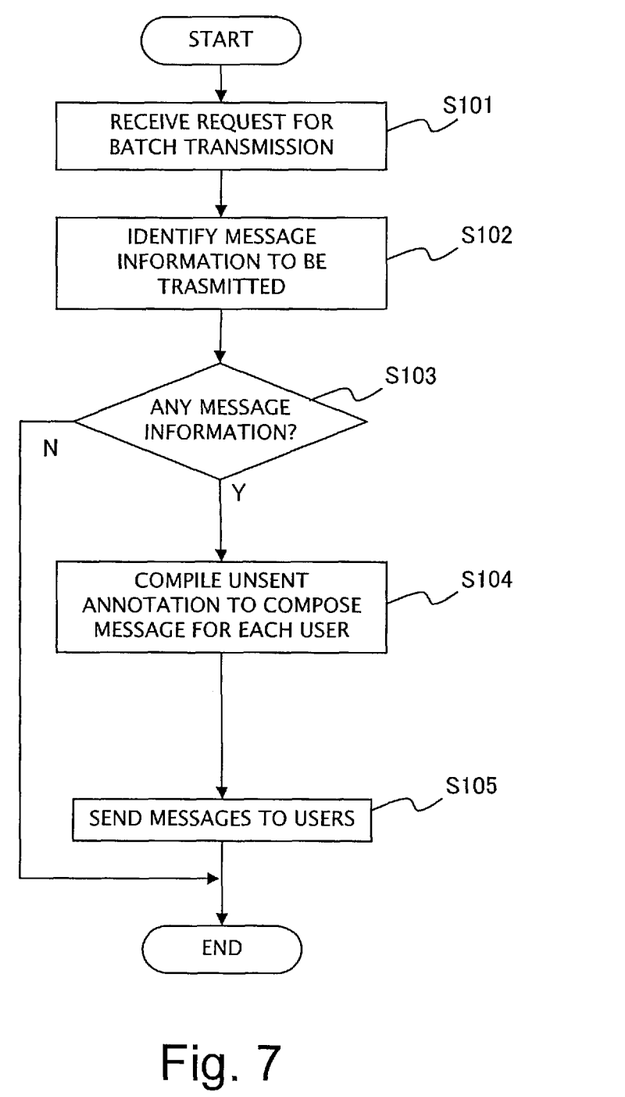
FIG. 7 is a flowchart showing a process for a case where a batch transmission request is received in the exemplary embodiment.
Figure 8:
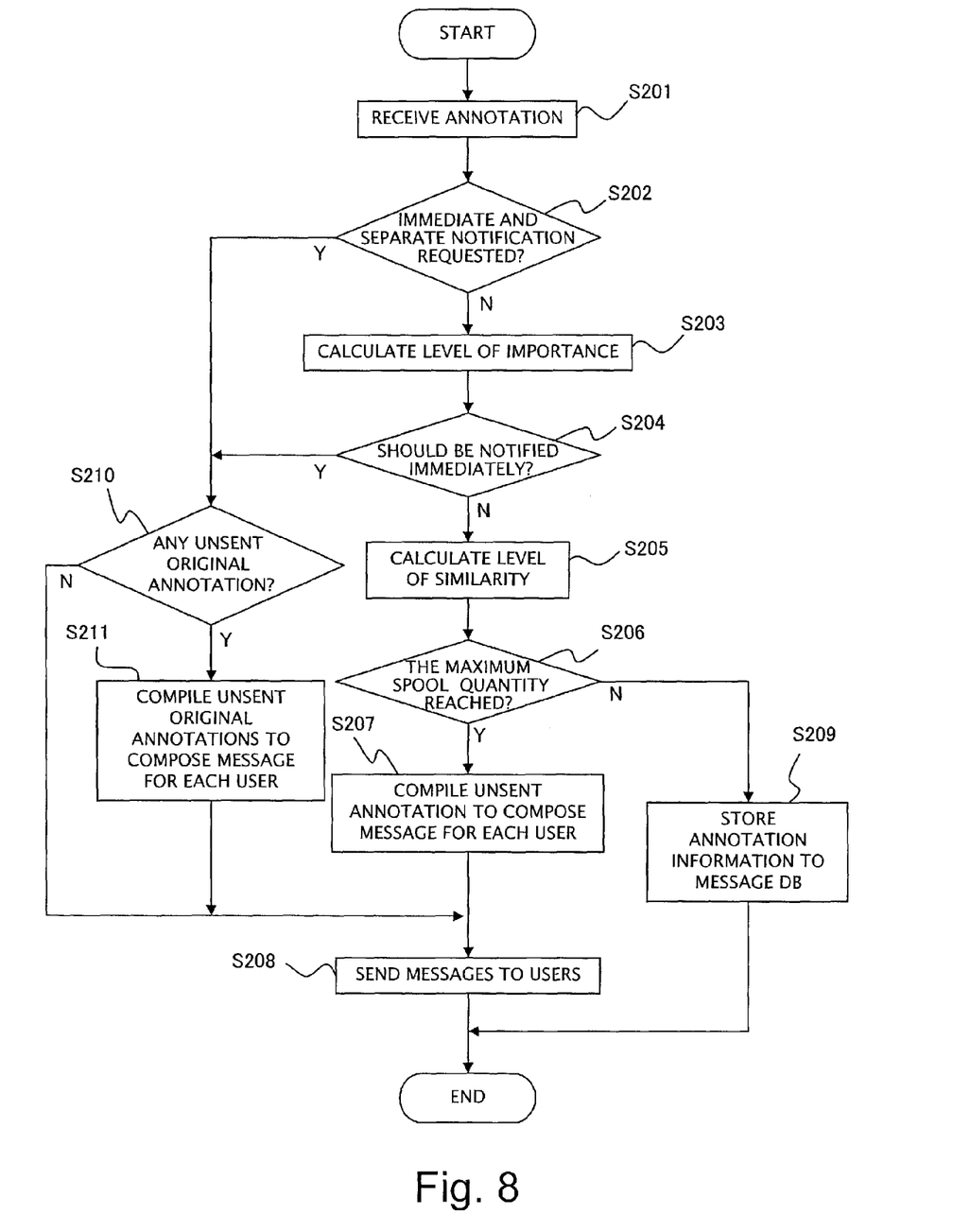
FIG. 8 is a flowchart showing a process for a case where an annotation is received in the exemplary embodiment.
Figure 9:
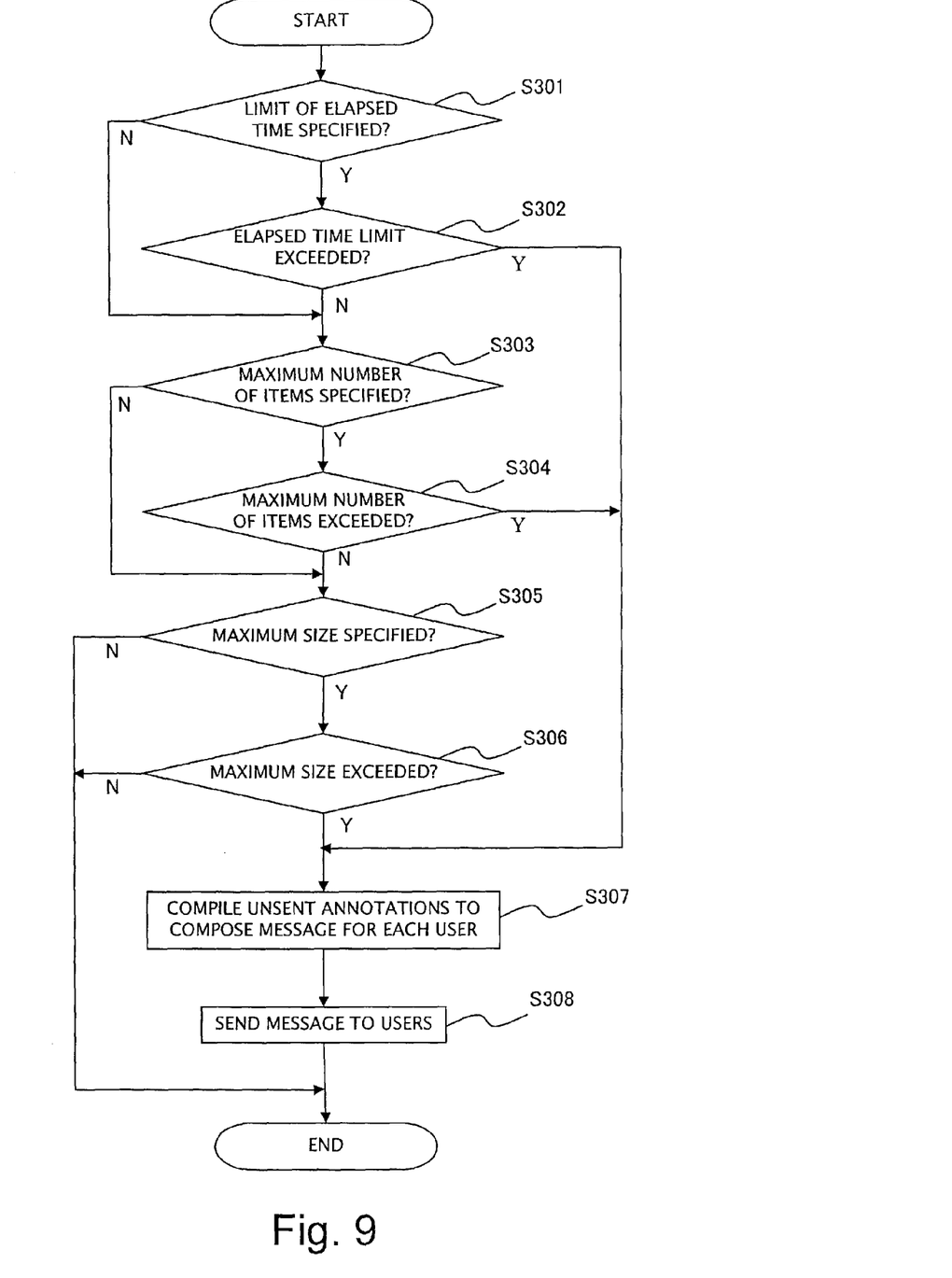
FIG. 9 is a flowchart showing a monitoring process that is periodically performed in the exemplary embodiment.

Timing for the message transmission processing unit 53 to send an electronic mail message to individual members includes three patterns as follows: 1. when the message management unit 68 receives a request for batch transmission that is sent upon determination that a user has finished reviewing contents of an electronic document and thus annotations added by the user should be transmitted at one time; 2. when the message management unit 68 receives an annotation and determines that the annotation should be immediately notified independently for a reason such as the annotation being important, or if not urgent, determines that the annotation should be transmitted; and 3. when the message management unit 68 determines that unsent annotations should be sent en masse based on periodical monitoring, even at the timing when the annotations are not received. FIGS. 7, 8 and 9 are flow charts that illustrate a process that is performed when a batch transmission request is received, a process performed when an annotation is received, and periodically performed monitoring process, respectively. Although these flowcharts will be used to describe each of the cases below, accumulation of annotations will be first discussed because the present exemplary embodiment makes it a rule not to transmit annotations unconditionally to members each time an annotation is received.

Review of an electronic document is not always finished in one day but may take several days depending on the volume of the document. In this exemplary embodiment, the task of reviewing an electronic document is managed on the server computer 20 which has a collaboration function. Thus, management of annotations added to electronic documents is made on the document management server 30, but task management of reviewing electronic documents is made on the server computer 20.

A member who should perform the task of reviewing an electronic document sends a request for retrieving the electronic document he wants to review to the document management server 30. The document management unit 52 of the document management server 30 retrieves the electronic document to be reviewed from the document database 54 in accordance with the document retrieval request sent from the client 10 used by the member, retrieves annotations added to the electronic document from the annotation information database 56, and merges the electronic document and the annotations. The document sending/receiving processing unit 51 sends the electronic document merged by the document management unit 52 to the requesting client 10.

Figure 10:
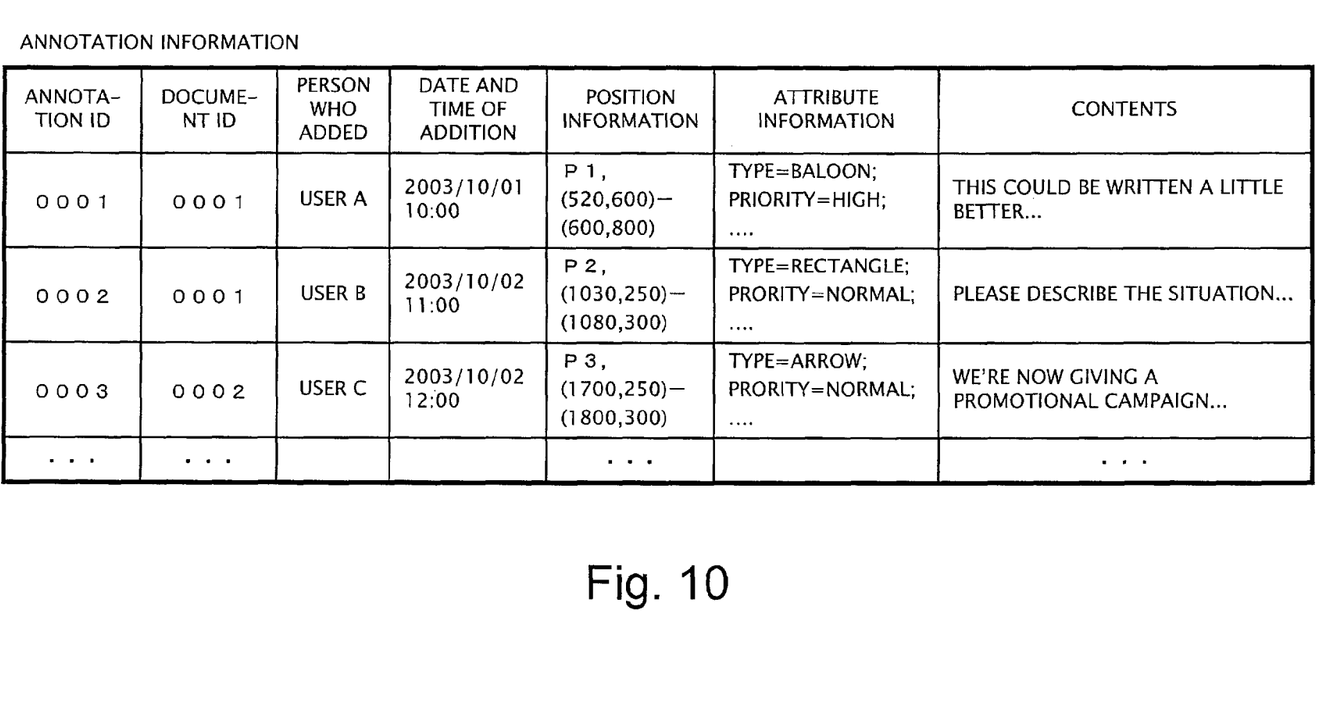
FIG. 10 shows an exemplary data structure in an annotation information database in the exemplary embodiment.

When the electronic document with annotations added is sent from the client 10, the document sending/receiving processing unit 51 receives the electronic document. An electronic document may be sent when reviewing of it has finished, or when reviewing for the day has finished even if reviewing itself is not completed. When the electronic document is sent, the document management unit 52 separates the annotations from the electronic document and stores the electronic document in the document database 54, while registering the annotations in the annotation information database 56. FIG. 10 shows an exemplary data structure for information on annotations that is registered in the annotation information database 56.

As shown in FIG. 10, for each annotation added, information on an annotation is structured as a set of an annotation ID which identifies the annotation, the document ID of the electronic document to which the annotation is added, the user ID of the user who added the annotation, date and time of addition, position information for identifying the position at which the annotation is added in the electronic document, type of the annotation, attribute information including level of priority, and contents of a comment that is described as the annotation. The position information is represented by a page number on which the annotation is added in the electronic document, and assuming that the shape of an area in which the annotation is added is a rectangle, by coordinate data of upper left and lower right extension points of the area with the upper left of the page as the point of origin.

The document management unit 52 registers information on the annotations in the annotation information database 56 and also sends the annotations to the message transmission processing unit 53. The following will describe with respect to FIG. 8 a process that is performed at the message transmission processing unit 53 when it receives annotations sent from the document management unit 52.

When the annotation information input unit 60 of the message transmission processing unit 53 receives an annotation sent from the document management unit 52 (step 201), the message management unit 68 checks whether information representing an instruction for requesting immediate and separate notification is set in the attribute information of the annotation. When the user explicitly instructs separate and immediate notification with flag information for instructing separate and immediate notification in an annotation or by clearly describing so as a comment, information representing the instruction is set in the attribute information for the annotation.

If a request for immediate and separate notification is not set (N at step 202), the message management unit 68 requests the message importance analysis unit 63 to calculate the importance of the annotation. The message importance analysis unit 63 analyzes the annotation sent to it to calculate the importance of the annotation (step 203). This exemplary embodiment counts the number of characters of a comment that is described as the annotation. That is, level of importance is determined based on the number of characters contained in a comment. This is based on an assumption that the more important what one wants to tell to other members is, the more characters will be written in a comment, and thus the number of characters contained in a comment is considered to be proportional to level of importance. In this exemplary embodiment, determination of whether an annotation is important or not is made by comparing the number of characters contained in the comment with a predetermined threshold value. If the number of characters of a received annotation is less than the threshold value and the annotation is thus determined to be not important and thus not worth notification to members immediately (N at step 204), the procedure then proceeds to calculation of similarity. Level of importance may be determined by setting flag information that indicates whether an annotation is important or not in its attribute information, or by making reference to information on remarks and/or persons who made remarks (i.e., one who has added annotations) that is accumulated in the external communication environment database 22.

Then, the message management unit 68 requests the message similarity analysis unit 64 to calculate similarity (step 205). The message similarity analysis unit 64 calculates similarity by analyzing the person who added the annotation, date and time of addition, type (e.g., comment, opinion, question) with reference to attribute information for the annotation, for example. In this exemplary embodiment, a group number (or classification category number) is obtained for classifying the annotation to any one group (or classification category) based on attribute information mentioned above. Analysis of similarity will be described in more detail below. An annotation may also be classified to a classification category by means of a document classification service provided by the collaboration function.

Then, the message management unit 68 determines if a predetermined maximum spool amount has been reached after receiving the annotation, and if it has not been reached (N at step 206), it registers information on an annotation that has been received but is not to be transmitted immediately in the message database 57 as message information. An exemplary data structure of message information registered in the message database 57 is illustrated in FIG. 11.

Figure 11:
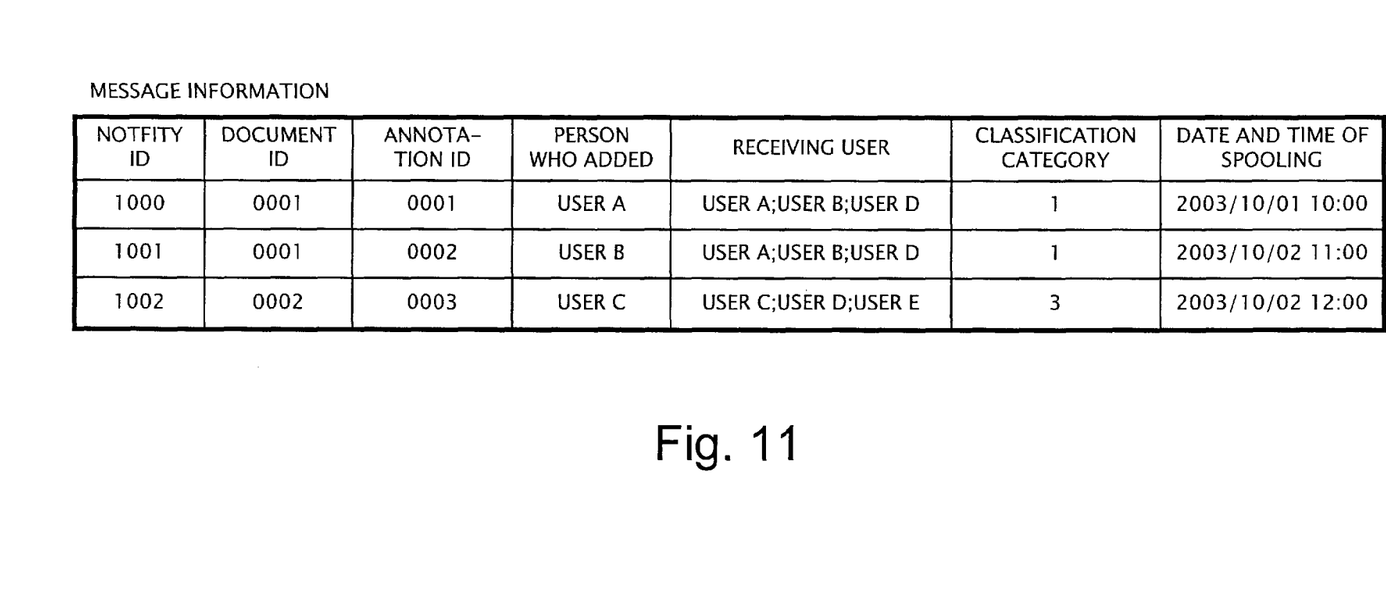
FIG. 11 shows an exemplary data structure in a message database in the exemplary embodiment.

As shown in FIG. 11, message information is set and registered such that a Notify ID is associated with a document ID, an annotation ID, the person who added the annotation, receiving members, a classification category, and date and time of spooling. The document ID, annotation ID, and the person who added the annotation are information that can be identified from the received annotation. Also, the document ID of the electronic document into which the annotation is added is set as the document ID, the ID of an added annotation is set as the annotation ID, and the user ID of the user who added the annotation is set as the person who added the annotation. For the receiving members, user IDs of all the users who are members registered in the user information database 58 are retrieved and set. For the classification category, a classification category determined through similarity calculation mentioned above (step 205) is set. For the date and time of spooling, the date and time at which the message information has been registered in the message database 57 is set.

As has been thus described, in this exemplary embodiment, when the message transmission processing unit 53 receives an annotation from the document management unit 52 and determines that the annotation need not be notified to members immediately, it registers the message information on the annotation, which is not going to be sent, in the message database 57.

It has been mentioned above that in this exemplary embodiment there are three patterns of timing to send a message to members by the message management unit 68 included in the message transmission processing unit 53. The first pattern will be described first for a case the message management unit 68 receives a request for batch transmission of annotations with respect to the flowchart shown in FIG. 7.

This exemplary embodiment assumes that a batch transmission request is received when a user has finished the task of reviewing an electronic document. That is, because the user has finished reviewing, it is no longer necessary to spool message information that has the user as the person who added it in the message database 57. Since task management is performed on the server computer 20 in this exemplary embodiment, the document processing completion detecting unit 65 detects a user's completion of a task by periodically querying the server computer 20 on completion of the task of reviewing by users (or members) via the external database interface unit 66. When it detects completion of the task by any one of the users, the document processing completion detecting unit 65 notifies the message management unit 68 of a batch transmission request including the user's ID.

Upon receiving the batch transmission request sent from the document processing completion detecting unit 65 (step 101), the message management unit 68 identifies one or more pieces of message information that has the user ID contained in the request set as the person who added it (step 102). If there is at least one piece of message information (Y at step 103), the message management unit 68 requests the message composition unit 61 to compose a message. However, if there is no appropriate message information (N at step 103), it means there is no annotation to be notified to other members, and thus the process is terminated.

The message composition unit 61 compiles annotations together into one message for each user with reference to receiving members contained in each identified unsent message information in response to the instruction from the message management unit 68 so that one message will be sent to each user (step 104). When there is only one annotation, one message will of course be composed with the single annotation. The message transmission unit 67 then sends messages created for individual users by the message composition unit 61 to the users by electronic mail in accordance with an instruction from the message management unit 68 (step 105). Mail addresses as the destination of the mails can be obtained by referencing the user information database 58.

In this exemplary embodiment, electronic mails will be transmitted to all the users who are members. Thus, a message will also be transmitted by electronic mail to a user who has added annotations. Of course, to exclude the user who added annotations from transmission, the user can simply be deleted from a list of receiving users in message information.

In this exemplary embodiment, annotations that should be transmitted to each user are compiled to compose one message as a rule. This can consequently prevent reduction of users' work efficiency or increase in system load because annotations can be compiled into a single electronic mail to be sent to each user even when a large number of annotation are added. However, in some cases, it may be more convenient for users to group similar annotations together than to simply compile all annotations into one electronic mail. Thus, it is also possible to group all annotations to be sent, by user and by classification category, to compose messages with reference to classification category contained in message information. The criteria for grouping are not limited to the present process but may be similarly applied to message composition to be discussed later.

The following will describe, with reference to the flowchart shown in FIG. 8, the process of the second pattern for a case where the message transmission processing unit 53 receives an annotation and the message management unit 68 determines that the annotation should be notified immediately, independently, for a reason such as the annotation being important, or if not urgent, determines that the annotation should be transmitted.

When the annotation information input unit 60 of the message transmission processing unit 53 receives an annotation sent from the document management unit 52 (step 201), the message management unit 68 checks whether information representing an instruction to request immediate and independent notification is set in the attribute information for the annotation. If such information is not set (N at step 202), the message importance analysis unit 63 calculates the importance of the annotation in accordance with an instruction from the message management unit 68 (step 203). As the calculation of importance has already been described, further description is omitted here.

If an immediate and independent notification request is contained in the attribute information for the annotation (Y at step 202), or if the message management unit 68 determines that the annotation should be immediately notified by referencing the result of importance calculation from the message importance analysis unit 63 (Y at step 204), the message management unit 68 confirms whether or not there is an unsent original annotation relating to the annotation which should be sent immediately. Hereinafter, the original annotation and the reason for confirming presence of an original annotation will be described.

Taking electronic mail as an example, it is a frequently performed mail operation to select the "Reply" button for a received electronic mail (hereinafter a "received mail") to send back an electronic mail. Since the electronic mail sent back (hereinafter a "reply mail") is a mail that is returned in reply to the received mail, depending on the situation, a case may arise where a person receiving the original "received mail" sends a "reply mail" before all other recipients have actually received the original "received mail", and so those recipients might be unable to understand the contents of the "reply mail". For this reason, if it is known that a received mail has not been received by some recipients when a reply mail is going to be sent, it is desirable to send the original received mail that caused the reply mail before the reply mail, or together with the reply mail at least. Thus, if an annotation which is requested to be immediately notified by itself is equivalent to such a reply mail, it is desirable to confirm whether or not there is an "original annotation" equivalent to a received mail before sending the reply mail, and if a received mail has not been transmitted, the received mail is preferably sent along with the reply mail.

For this reason, when an annotation is to be immediately notified, the message management unit 68 searches the message database 57 to confirm whether there is an unsent original annotation for the annotation to be immediately notified. If such an original annotation exists (Y at step 210), the message composition unit 61 compiles the annotation to be immediately notified and the original annotation into one message to each user in accordance with the instruction from the message management unit 68 (step 211). Annotations may be added forming hierarchical relationships, e.g., when a user writes a comment on a comment that is described in an annotation and another user further makes a comment on that comment. In such a case, unsent annotations at each level of the hierarchy that have been added before the annotation which should be immediately notified are compiled into a single message.

Presence of an original annotation for a certain annotation is included in annotation information with a rule for description defined like "Re:" in electronic mail, for example. Alternatively, since relating annotations are generally added being arranged at one position or overlapping each other, in the exemplary embodiment, reference may be made to position information contained in annotation information in the annotation information database 56 and relations among annotations may be automatically determined from positional relationships of the annotations.

After messages to individual users are composed in this manner, the message transmission unit 67 sends the messages composed for individual users by the message composition unit 61 to the users by electronic mail in accordance with an instruction from the message management unit 68 (step 208). If there is no unsent original annotation (Y at step 210), there is no annotation that can be compiled with the annotation to be immediately notified, and thus messages that contain only the annotation to be immediately notified will be sent to appropriate users.

As mentioned above, if it is determined that a received annotation should be immediately notified even by itself in accordance with a user's instruction or because the notification is determined to be important based on internal processing, the annotation is immediately transmitted by itself without being spooled internally. However, if an original annotation has not been transmitted when such an annotation is to be transmitted, the annotation can be transmitted with the original annotation even if it is requested to notify the annotation by itself.

The process described above for the second pattern is executed when a user gives an explicit instruction to do so and when a received annotation is determined to be important based on internal processing. However, it may be desirable to transmit an annotation even if the annotation is not urgent. For example, such a case is when a large number of unsent message have accumulated in the message database 57 because they do not meet conditions for transmission. This represents a situation in which annotations are not notified to members even though many annotations have been added to electronic documents, and this is not necessarily preferable in terms of information sharing. Thus, after similarity is calculated at step 205 in FIG. 8, the message management unit 68 checks the number of messages accumulated in the message database 57 and compares it with a predetermined threshold value (i.e., the maximum spool quantity). If the number of accumulated messages has reached the maximum spool quantity (Y at step 206), the message composition unit 61 compiles annotations together into one message for each user with reference to receiving users contained in each piece of identified unsent message information in accordance with an instruction from the message management unit 68, so that one message will be transmitted to each user (step 207). The message transmission unit 67 then sends the messages to individual users composed by the message composition unit 61 to the users by electronic mail in accordance with an instruction from the message management unit 68 (step 208). Processing at steps 207 and 208 is the same as steps 104 and 105 shown in FIG. 7.

The following will describe, with reference to the flowchart shown in FIG. 9, the process of the third pattern for a case where the message management unit 68 determines that unsent annotations should be transmitted all at once based on periodic monitoring, even at the time when those annotations are not received. This process is carried out under control of the message management unit 68 based on an instruction on spool checking which is periodically output by the spool monitoring unit 62.

This exemplary embodiment has illustrated elapsed time, the maximum number of items and the maximum size of items that are monitored in message information temporarily saved in the message database 57. Data on the monitored items and thresholds may be predefined internally in the message management unit 68 or may be contained in a spool checking instruction sent by the spool monitoring unit 62.

Elapsed time is time that has elapsed since message information is registered in the message database 57. Not to transmit annotations unconditionally for a long time even for the purpose of spooling them for batch transmission is not preferable because it means that contents of the annotations are not informed to other members. Accordingly, this exemplary embodiment defines the upper limit of time for which annotations are spooled without being transmitted so that annotations are forcibly transmitted if they have not been transmitted within the predetermined time after being registered in the message database 57, irrespective of whether annotations that can be compiled with them have been received or not.

As mentioned above, the message data base 57 maintains multiple pieces of message information. The maximum number of items is the upper limit of the number of message information items to be registered in the message database 57 and the maximum size is the upper limit of the total size of message information registered in the message database 57.

In FIG. 9, if the upper limit of elapsed time is specified (Y at step 301), the message management unit 68 first compares the difference between the current time and date and time of spooling contained in each piece of message information with the preset upper limit of elapsed time. If there is message information that has been registered for more than the predetermined elapsed time (Y at step 301), the message composition unit 61 searches the message database 57 to thereby put unsent message information together to compose one message for each user who is registered as a receiving user contained in the message information (step 307). Then, the message transmission unit 67 sends the messages to individual users composed by the message composition unit 61 to the users by electronic mail in accordance with an instruction from the message management unit 68 (step 308).

If an upper limit for elapsed time is not specified (N at step 301), the message management unit 68 then confirms whether the maximum number of items is specified as a monitored item. If the upper limit is specified (Y at step 303), the message management unit 68 determines the number of message information items registered in the message database 57 and compares the number of registrations with the maximum number of items. If the number of registrations exceeds the maximum number of items (Y at step 304), the message composition unit 61 compiles unsent message information registered in the message database 57 to compose one message for each user (step 307). Then, the message transmission unit 67 sends messages for individual users composed by the message composition unit 61 to the users by electronic mail in accordance with an instruction from the message management unit 68 (step 308).

If the maximum number of items is not specified (N at step 303), the message management unit 68 subsequently confirms whether the maximum size is specified as a monitored item. If the maximum size is specified (Y at step 305), the message management unit 68 determines the total size of message information registered in the message database 57 and compares the total size with the maximum size. If the total size exceeds the maximum size (Y at step 305), the message composition unit 61 compiles unsent message information registered to the message database 57 to compose a message for each user (step 307). Then, the message transmission unit 67 sends messages for individual users composed by the message composition unit 61 to the users by electronic mail in accordance with an instruction from the message management unit 68 (step 308).

On the other hand, if the maximum size is not specified (N at step 306), nothing is transmitted and the process is terminated.

This exemplary embodiment provides such periodical monitoring of the message database 57 and, if a predetermined time has elapsed since an annotation is registered or if the number or size of message information exceeds an upper limit, annotations are compiled together for each user so as to notify the annotations to users.

Although the exemplary embodiment sets threshold values as criteria for determining whether an annotation should be transmitted or not at the system level, they may also be set on a per-user basis.

Although the exemplary embodiment illustrates the three monitored items including elapsed time and so on, this is not a limitation. In addition, the order of checking the threshold values is not limited to the one illustrated in FIG. 9.

As has been thus described, this exemplary embodiment has been described with the three patterns for transmission of messages which are composed by compiling annotations together to individual users that is carried out when conditions for transmission are met, i.e., when a request for immediate and separate transmission is received, when an annotation for which a request for immediate and separate notification is set is received, when a received annotation is determined to be important, and when an annotation should be transmitted based on periodical monitoring of message information.

Calculation of similarity will be now described. When annotations are composed to compose one message in this exemplary embodiment, selection of annotations to be compiled together is made in accordance with a certain criterion. For example, it has been already mentioned that annotations can be grouped in terms of relationship of annotation reply or positions in an electronic document at which annotations are added (e.g., being close or overlapping each other). Other possible criteria for grouping annotations are as follows.

First, types of annotation include rectangles, balloon shapes, or arrow shapes. Annotations can be thus grouped by typed with reference to attribute information contained in annotation information as illustrated in FIG. 10. Annotations can also be grouped by time with reference to time and date of spooling contained in message information. It is also possible to group annotations that are added being associated with contents of an electronic document, e.g., a keyword like "supplement". Alternatively, annotations can be grouped based on keywords that are contained in a comment written as an annotation.

As mentioned above, when a user reviews an electronic document, the document management unit 52 of the document management server 30 retrieves the electronic document to be reviewed from the document database 54 in accordance with a document retrieval request sent, retrieves annotations added to the electronic document from the annotation information database 56, and merges the electronic document with the annotations and then provides the electronic document to the user. Thus, the user can obtain the electronic document that contains all annotations which have been added by the time of retrieval. That is, by being registered in the message database 57, some annotations may not have been received by the user by electronic mail. From the users viewpoint, the user need not be notified of annotations which are added to an electronic document by the document management server 30 by electronic mail independently.

Thus, in this exemplary embodiment, such annotations are not transmitted to a user who has obtained the electronic document, which is handled in the following manner.

After having the document sending/receiving processing unit 51 send an electronic document to the requester, the document management unit 52 notifies the user ID of the user who has obtained the electronic document to the message sending/receiving processing unit 53. The message management unit 68 of the message transmission processing unit 53 searches receiving users contained in message information registered in the message database 57 by the user ID sent from the document management unit 52 so as to identify message information for which the user ID is set, and deletes the user ID from the receiving users for the identified message information. Consequently, the user is excluded from transmission of the message information, so that the user will not receive annotations separately by electronic mail that the user has viewed by referencing electronic documents or annotations that the user can view.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An annotation information distribution apparatus including a processor, comprising: a section that receives a first annotation which is added, by a user, to a shared electronic document in a task in which a plurality of users participate;
   a storage section that stores the first annotation;
   a section that, in a case where it is determined that a condition for transmission is met, identifies an annotation relevant to the first annotation from among annotations stored in the storage section, and composes a message in which content of both the identified annotation and the first annotation is described, in the form of electronic mail which is to be transmitted to the plurality of users;
   a determination section that, in a case where it is determined that the condition for transmission is not met, determines if the storage section stores a second annotation to which the first annotation is added as a reply, and about which any message has not been transmitted to the plurality of users; and
   a section that, in a case where the determination section determines that the storage section stores the second annotation, composes a first message in which content of both the first and second annotations is described, and composes, in a case where the determination section determines that the storage section does not store the second annotation, a second message in which content of only the first annotation is described;
   wherein the determination section determines if the first annotation is the reply to the second annotation based upon whether the first and second annotations are arranged at one position in the electronic document or whether the first and second annotations are arranged at overlapping positions, with respect to each other, in the electronic document;
   wherein the condition for transmission is whether a number of characters of the first annotation is equal to or greater than a predetermined number of characters.

2. The annotation information distribution apparatus according to claim 1, further comprising a processing completion detecting section that detects completion of the task, wherein the task is a task related to reviewing the shared electronic document by adding an annotation to the electronic document, wherein, when the processing completion detecting section detects the completion of the task, the message management section identifies unsent annotation information added to the electronic document as information that should be transmitted.

3. The annotation information distribution apparatus according to claim 1, wherein the message management section identifies unsent annotation information that has not been transmitted within a certain time period as information that should be transmitted.

4. An annotation information distribution apparatus according to claim 1, wherein the message management section identifies annotation information that should be transmitted based on contents of description of the received annotation information.

5. The annotation information distribution apparatus according to claim 1, further comprising
   a document transmission section that merges an electronic document that should be retrieved in response to a document retrieval request with annotation information of the electronic document, and then transmits the merged document to a request or of the document retrieval, wherein the message management section excludes the user, who requested the retrieval of the document and to whom the document transmission section has transmitted the electronic document, from message transmission.

6. The annotation information distribution apparatus according to claim 1, wherein an annotation relevant to the first annotation is an annotation which has been added to the electronic document by the first user.

7. An annotation information distribution apparatus including a processor, comprising: a section that receives an annotation which is added to a shared electronic document in a task in which a plurality of users participate; a first determination section that determines if a first user who participates in the task has completed a review of the shared electronic document;
   a storage section that stores a first annotation;
   a section that, in a case where it is determined that the first user has completed the review of the shared electronic document and that a condition for transmission is met, identifies an annotation, which has been added by the first user, from among annotations stored in the storage section, and composes a message in which content of both the identified annotation and the first annotation is described, in the form of electronic mail which is to be transmitted to the plurality of users;
   a second determination section that determines, in the case where the first determination section does not determine that a first user has completed the review of the shared electronic document, whether the storage section stores a second annotation to which the first annotation is added as a reply and about which any message has not been transmitted to the plurality of users; and a section that, in a case where the second determination section determines that the storage section stores the second annotation, composes a first message in which content of both the first and second annotations is described, and composes, in a case where the second determination section does not determine that the storage section stores the second annotation, a second message in which content of only the first annotation is described;

wherein the second determination section determines if the first annotation is the reply to the second annotation based upon whether the first and second annotations are arranged at one position in the electronic document or whether the first and second annotations are arranged at overlapping positions, with respect to each other, in the electronic document;

wherein the condition for transmission is whether a number of characters of the first annotation is equal to or greater than a predetermined number of characters.

8. A non-transitory computer readable medium storing a program causing a computer to execute processes, the processes comprising:

receiving a first annotation which is added, by a user, to a shared electronic document in a task in which a plurality of users participate;

storing the first annotation in a storage section;

identifying, in a case where it is determined that a condition for transmission is met, an annotation relevant to the first annotation from among annotations stored in the storage section, and composing a message in which content of both the identified annotation and the first annotation is described, in the form of electronic mail which is to be transmitted to the plurality of users, the condition for transmission being whether a number of characters of the first annotation is equal to or greater than a predetermined number of characters;

determining, in a case where it is determined that the condition for transmission is not met, if the storage section stores a second annotation to which the first annotation is added as a reply, and about which any message has not been transmitted to the plurality of users;

composing, in a case where it is determined that the storage section stores the second annotation, a first message in which content of both the first and second annotations is described;

composing, in a case where it is determined that the storage section does not store the second annotation, a second message in which content of only the first annotation is described; and determining if the first annotation is a reply to the second annotation based upon whether the first and second annotations are arranged at one position in the electronic document or whether the first and second annotations are arranged at overlapping positions, with respect to each other, in the electronic document.

* * * * *